United States Patent
Regaard et al.

(10) Patent No.: US 8,207,471 B2
(45) Date of Patent: Jun. 26, 2012

(54) METHOD FOR MEASURING PHASE BOUNDARIES OF A MATERIAL DURING MACHINING WITH A MACHINING BEAM USING ADDITIONAL ILLUMINATION RADIATION AND AN AUTOMATED IMAGE PROCESSING ALGORITHM, AND ASSOCIATED DEVICE

(75) Inventors: Boris Regaard, Ypsilanti, MI (US); Anas Moalem, Hannover (DE); Jan Michel, Meerbusch (DE); Peter Abels, Alsdorf (DE); Stefan Kaierle, Herzogenrath (DE); Wolfgang Schulz, Langerwehe (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 966 days.

(21) Appl. No.: 11/885,812

(22) PCT Filed: Mar. 7, 2006

(86) PCT No.: PCT/DE2006/000400
§ 371 (c)(1),
(2), (4) Date: Aug. 8, 2008

(87) PCT Pub. No.: WO2006/094488
PCT Pub. Date: Sep. 14, 2006

(65) Prior Publication Data
US 2009/0032512 A1 Feb. 5, 2009

(30) Foreign Application Priority Data
Mar. 7, 2005 (DE) .......................... 10 2005 010 381

(51) Int. Cl.
*B23K 26/03* (2006.01)
(52) U.S. Cl. .............................. 219/121.61; 219/121.83

(58) Field of Classification Search ........... 219/121.61–121.72, 121.83, 121.85; 700/166
See application file for complete search history.

(56) References Cited

U.S. PATENT DOCUMENTS
4,943,160 A * 7/1990 Gevelber et al. .............. 356/625
5,698,120 A * 12/1997 Kurosawa et al. ....... 219/121.62
(Continued)

FOREIGN PATENT DOCUMENTS
DE 4106008 8/1992
JP 57137089 A * 8/1982
JP 09-225666 9/1997
(Continued)

*Primary Examiner* — Samuel M Heinrich
(74) *Attorney, Agent, or Firm* — Renner Kenner Greive Bobak Taylor & Weber

(57) ABSTRACT

The present invention relates to a method for measuring phase boundaries of a material during the machining of a workpiece (12) with a machining beam, more preferably with a laser beam, and a device that is embodied in such a way as to carry out the method. According to said method, during the machining, a machining region (13) containing the impact point of the machining beam (1) on the workpiece (12) is illuminated at least approximately coaxially to the machining beam (1) by means of additional optical radiation (2). Radiation (3) reflected by the machining region (13) is detected, parallel to an incidence direction of the optical radiation (2) or at small angle thereto, by means of an optical detector with local resolution, in order to obtain an optical reflection pattern of the machining region (13). From the optical reflection pattern, a course of at least one liquid/solid phase boundary in the machining region (13) is then determined in an automated manner by means of an image processing algorithm on the basis of a transition from an area containing a large-surface homogeneous area and an area containing a plurality of small-surface homogeneous areas in the optical reflection pattern.

11 Claims, 3 Drawing Sheets

U.S. PATENT DOCUMENTS

| | | | |
|---|---|---|---|
| 6,311,099 B1 | 10/2001 | Jasper et al. | 700/166 |
| 6,757,055 B1 | 6/2004 | Kluft | 356/73 |
| 6,791,057 B1 * | 9/2004 | Kratzsch et al. | 219/121.63 |
| 7,449,699 B1 * | 11/2008 | Adams et al. | 250/492.1 |

FOREIGN PATENT DOCUMENTS

| | | |
|---|---|---|
| JP | 2000263266 | 9/2000 |
| JP | 2001-287064 | 10/2001 |

* cited by examiner 16   17              16   17
  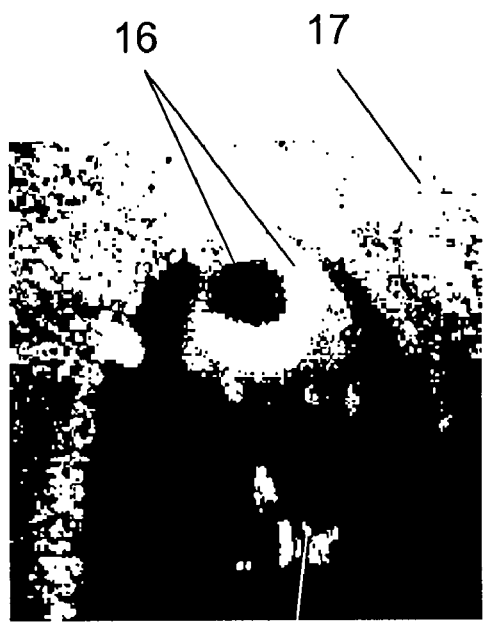
Fig. 2                    19
16   17              16   17
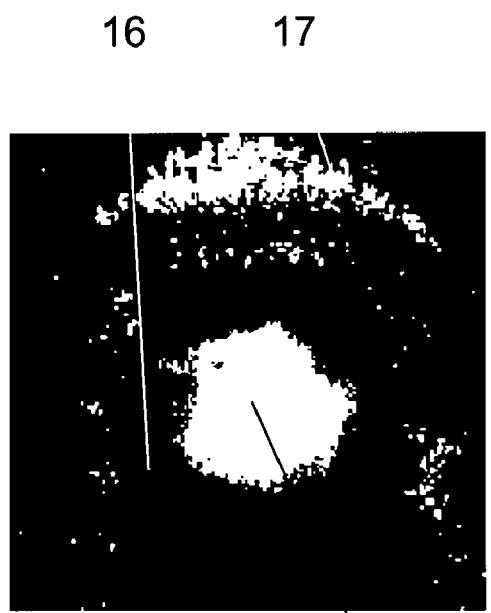  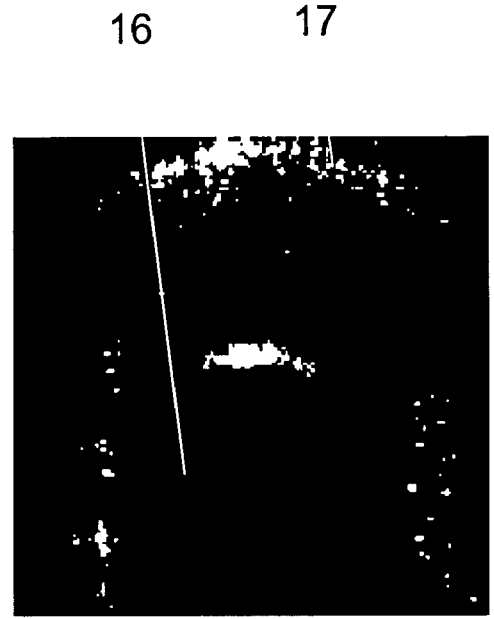
Fig. 5
18

METHOD FOR MEASURING PHASE BOUNDARIES OF A MATERIAL DURING MACHINING WITH A MACHINING BEAM USING ADDITIONAL ILLUMINATION RADIATION AND AN AUTOMATED IMAGE PROCESSING ALGORITHM, AND ASSOCIATED DEVICE

TECHNICAL AREA OF APPLICATION

The present invention relates to a method for measuring phase boundaries of a material during the machining of a workpiece with a machining beam, more preferably with a laser beam, and a device for the machining of a workpiece, which is designed for carrying out the present method.

To achieve a satisfactory machining result monitoring of the machining process during the machining of materials with energetic radiation is very important. This applies also to the laser material machining, a preferred area of application of the present method, where a laser beam for example for welding, for cutting or for depositing or generating is passed over the surface of a workpiece. During this process the material briefly melts in the region of the impact point of the laser beam on the workpiece, wherein generally material simultaneously is transformed from the solid or liquid to the gaseous phase and is thus removed. Monitoring of the processes in this machining region during laser machining is desirable for the monitoring of the machining process.

PRIOR ART

For the automated evaluation of machining processes with high-energy radiation it is known to monitor the secondary radiation of the machining process co-axially or laterally to the machining radiation with suitable optical sensors or detectors. Here, the radiation generally is either plasma or metal vapour radiation in the wavelength range between 400 nm and 650 nm or process heat radiation in the wavelength range between 900 nm and 10 µm. The analysis of the plasma radiation allows statements with respect to the keyhole geometry, for example the welding-in depth during welding processes and with respect to the plasma or metal vapour diffusion. The analysis of the heat radiation supplies information with respect to the relative temperature distribution on and above the workpiece.

DE 19716293 A1 for example relates to a device for controlling welding parameters during laser beam welding, where evaluation of CCD images of the melt region takes place on the basis of the secondary radiation.

In addition, devices for monitoring laser beam welding processes are known, which illuminate the machining region laterally to the machining beam with radiation sources of high power density and monitor said machining region laterally to the machining beam using a camera. In this way, splatter formation above the machining region can be visualised for example.

JP 2001-287064 describes a method for visualising the machining region during the machining of a workpiece with a machining beam, where the machining region is illuminated with optical radiation at least approximately coaxially to the machining beam and radiation reflected from the machining region is detected with an optical detector with local resolution. The image obtained is visualised on a monitor in real time to monitor the machining process.

From DE 19852302 A1 a method for the machining of workpieces with high energy radiation is known, where through additional external illumination a light line is generated in the vicinity of the machining region in order to perform optical measurements on the workpiece for example through a light-slit method. In the process, reference is also made to the possibility of a measurement of the melt bath created at the machining point without stating however how such measurements should take place.

The object of the present invention consists in stating a method for measuring phase boundaries of a material during the machining of a workpiece with a machining beam and a device designed for carrying out the method, by means of which the course of the phase boundary liquid/solid in the machining region can be determined.

PRESENTATION OF THE INVENTION

The object is solved with the method and with the device of the patent claims 1 and 9. Advantageous developments of the method and the device are the subject of the subclaims or can be taken from the following description and the exemplary embodiments.

With the present method a machining region containing the impact point of the machining beam on the workpiece during the machining is additionally illuminated with optical radiation at least approximately coaxially to the machining beam. Optical radiation reflected from the machining region is detected parallel to an incidence direction of the optical radiation or the machining beam on the workpiece, or at a small angle thereto, using an optical detector with local resolution in order to obtain an optical reflection pattern of the machining region. From the optical reflection pattern, the course of one or several phase boundaries liquid/solid is then determined in an automated manner by means of an image processing algorithm on the basis of a transition from an area containing a large-surface homogeneous area to an area with many small-surface homogeneous areas in the optical reflection pattern.

The present method exploits that the workpieces during material machining with a machining beam, more preferably during the laser material machining, in the solid or solidified state have surface roughnesses which, during vertical or only slightly inclined illumination to the surface create an irregular reflection pattern. The fusible phase in contrast has a substantially lesser roughness so that, compared with the mentioned surface roughnesses, it creates a large-surface homogeneous reflection pattern. This reflection pattern is detected with an optical detector, preferentially a camera with local resolution in at least approximately vertical re-reflection, i.e. at least approximately parallel to the illumination beam or machining beam and evaluated. The course of the phase boundary liquid/solid can be determined by means of the transition of large-surface homogeneous areas of the reflection pattern to regions with a plurality of, compared with this, small-surface homogeneous areas, which produce an irregular reflection pattern. In this way the course of the phase boundary between the melt and the still or again solid material during the entire machining can be monitored through the, coaxially with the machining beam, almost vertical illumination of the machining region and the local resolution detection of the optical radiation re-reflected from the machining region parallel to the incidence direction. The method merely requires a surface structure of the workpiece with a suitable roughness in order to allow detection of the phase boundary liquid/solid in a reflection pattern in the manner shown. This workpiece roughness is automatically present with most applications.

With the present method the course of the phase boundary liquid/solid of the workpiece to be machined can thus be measured in the machining region during the machining.

Determining the course of the phase boundary can be performed in an automated manner with a suitable image processing algorithm. In the main the method can be advantageously used for laser material machining, wherein all types of laser beam sources for example $CO_2$ laser, Nd:YAG laser or diode laser can be employed as beam sources for the machining beam. The method is suitable for all machining processes where the optical system for guiding the machining beam allows illumination and monitoring of the machining region parallel to the machining beam. An example is the laser material machining with $CO_2$ lasers, where the machining region for example can be illuminated and monitored through a bore in the focussing mirror for the laser radiation. Another example is the laser material machining with Nd:YAG lasers where illumination and monitoring for example can be performed via a dichroic mirror in the machining optics.

In an advantageous further development of the present method one or several regions of the melt of the material are additionally determined from the optical reflection pattern, in which the surface normal to the surface of the melt is situated within predeterminable limits approximately parallel to the machining beam. From this determination information with respect to the three-dimensional surface shape of the melt can be determined. The predeterminable limits of the angle of the surface normal to the beam axis of the machining beam can be set via the illumination angle or illumination angle range to this radiation axis. The maximum possible observation angle in this case is predetermined by the imaging characteristics of the illumination and detection optics. Regions of the melt, whose surface normal is situated within these predeterminable limits of the angle to the radiation axis of the machining beam reflect in a large surface manner and appear bright in the reflection pattern while regions with surface normals more intensively inclined to this beam axis do not re-reflect to the optical system, i.e. on the detector. These regions are dark in the reflection pattern so that the respective regions can be easily determined from the reflection pattern.

The optical radiation for illumination of the machining region is preferentially selected so that the secondary radiation created through the machining in comparison with the reflected optical radiation can be at least partly suppressed with an optical filter. This optical filter is arranged in front of the optical detector so that the reflection pattern of the likewise incident secondary radiation is not influenced or only to a minor extent. The intensity of the optical radiation for illumination of the machining region must also be selected adequately in magnitude in order to over-radiate the secondary radiation impacting on the detector.

In a further advantageous development of the method the optical filter is selected so that an adequate portion of secondary radiation is detected by the optical detector without having a negative influence on the evaluation of the reflection pattern of the reflected optical radiation. From the detected secondary radiation the phase boundary liquid/gaseous can then be additionally determined, which, mainly through different temperatures and thus a different brightness, can be detected in the long-wave radiation range.

With the present method and the associated device the evaluation of the reflection pattern takes place in an automated manner through a suitable image processing program. This image processing program must merely be able to identify dark and bright image areas as well as areas which are homogeneous and such which vary greatly in brightness and to determine the area boundaries. The present method can thus be carried out in a completely automated manner during the machining of the workpiece.

The device designed for the machining of a workpiece with a machining beam comprises a machining head having at least launching apertures for the machining beam and the illumination beam, beam forming optics and a deflection mirror for the machining beam, illumination optics and an optical detector with local resolution. The beam forming optics and the deflection mirror are arranged such that they direct the machining beam along a beam axis through an exit aperture onto a machining plane situated in front of the machining head. The illumination optics are arranged in the machining head such that they direct the illumination beam launched via the associated launching aperture at least approximately coaxially to the beam axis of the machining beam through the suitably designed deflection mirror onto the machining plane. The optical detector is designed for detection with local resolution of the optical radiation re-reflected from the machining plane parallel or at a small angle to the beam axis and suitably attached to the machining head. The optical detector is connected to an evaluation device which, with an image processing algorithm, carries out an evaluation of the detected reflection pattern to determine the course of the one or several phase boundaries by means of a transition from an area with a large-surface homogeneous area to an area with many small-surface homogeneous areas in the optical reflection pattern in an automated manner.

A particular advantage of the present method and the associated device consists in that through the at least approximately coaxial illumination and monitoring of the machining region no shading or distortion of the processing zone whatsoever occurs in the reflection pattern. The phase boundary between melt and solid material can thus be reliably detected at any time of machining. The automatic image processing allows monitoring of the machining process in real time which can also be employed to control or regulate this process.

Any light sources whose intensity is of sufficient magnitude compared with the intensity of the secondary radiation or which can be separated from this secondary radiation through an optical filter to an extent which is adequate for detection can be employed as illumination sources. Preferentially a laser, preferentially in form of a laser diode, is employed as illumination source.

BRIEF DESCRIPTION OF THE DRAWINGS

The present method and the associated device are explained once more in detail by means of exemplary embodiments in conjunction with the drawings without restriction of the protected area predetermined by the patent claims. Here it shows:

FIG. 2 two exposures of the machining region according to the present method which show a reflection pattern;

FIG. 5 two additional exposures obtained according to the present method which show a reflection pattern of the machining region.

WAYS TO CARRY OUT THE INVENTION

Figure 1:
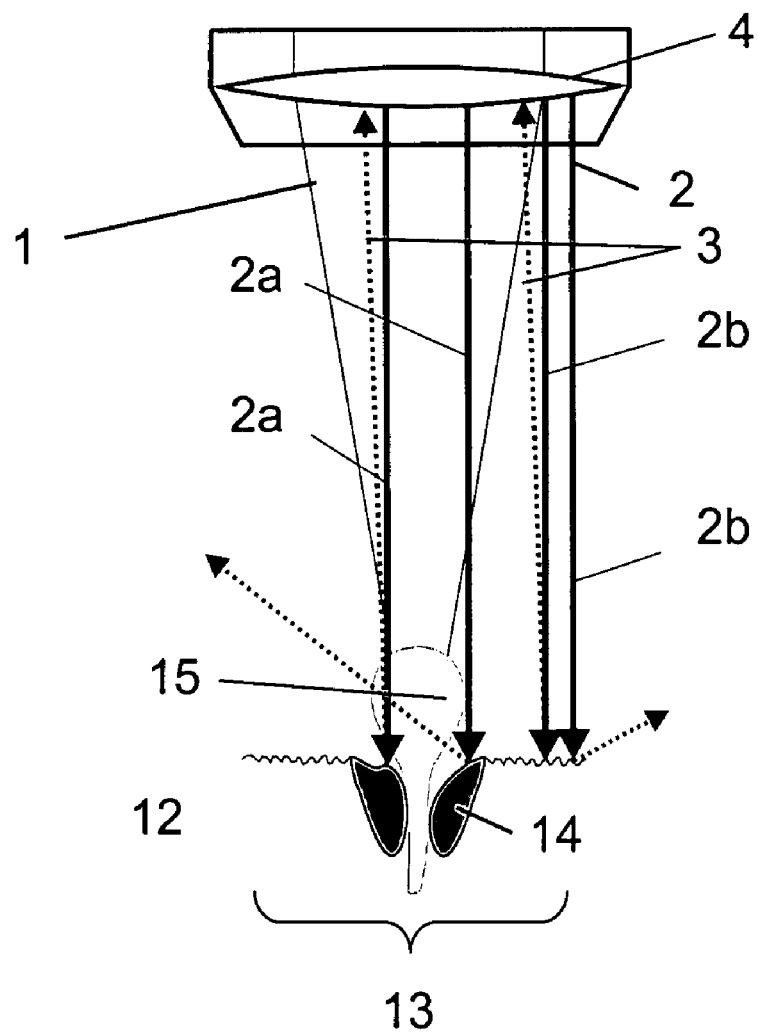
FIG. 1 schematically the situation during the laser machining of a workpiece with simultaneous coaxial illumination of the machining region.

FIG. 1 schematically shows the situation during the carrying out of the present method for machining a workpiece 12 with a machining beam, in the present case a laser beam 1. The laser beam 1 is focussed onto the surface of the workpiece 12 via the focussing optics 4 of which merely a part is visible in the figure. Through the high intensity of the laser beam 1 the material is locally transformed into the gaseous phase 15 at the impact location and partly locally subjected to initial melting, as is illustrated through the melt 14 in the FIG. 1.

Coaxially to the laser beam 1 the machining region 13 with the present method is illuminated with optical radiation 2 as is schematically indicated by the continuous arrows. This optical radiation 2 is reflected on the surface of the machining region 13 and beam portions 3 that have been re-reflected approximately parallel to the incidence direction of the optical radiation 2 or to the laser beam 1 are detected with local resolution with a camera. This camera is not shown in FIG. 1. During this exposure with the camera a reflection pattern of the machining region 13, which is brought about through the local intensity curve of the re-reflected beam portions 3, is obtained.

Portions 2a of the optical radiation 2 which impact on the surface of the melt 14 are re-reflected to the optical detector with approximately equal intensity. This produces a large-surface homogeneous area in the reflection pattern. Portions 2b of the optical radiation 2 which impact on the still solid or re-solidified area of the workpiece 12 are severely scattered because of the surface roughness and produce a small-surface reflection pattern. This is visible in the two exposures of the coaxially illuminated machining region of FIG. 2, which in the left figure shows a reflection pattern during the cutting and in the right figure a reflection pattern during the welding for Nd:YAG laser radiation. The boundary line between the large-surface homogeneous area detectable in these figures, which represents the melted area 16, and the area with a small-surface irregular reflection pattern, which represents the solid area 17, constitutes the phase boundary between the liquid phase and the solid phase.

The re-reflection in the area of the melt depends also on the direction of the local surface normal to the surface of the melt. Areas of the melt whose surface normal within adjustable limits is located parallel to the laser beam propagation, reflect the optical radiation in to the camera, while areas with surface normals inclined to the laser beam propagation do not re-reflect into the camera. These areas are thus dark in the camera exposure. This is likewise evident in FIG. 2. From the boundary line between bright and dark large-surface homogeneous areas information on the shape of the surface of the melt can thus be obtained.

Figure 3:
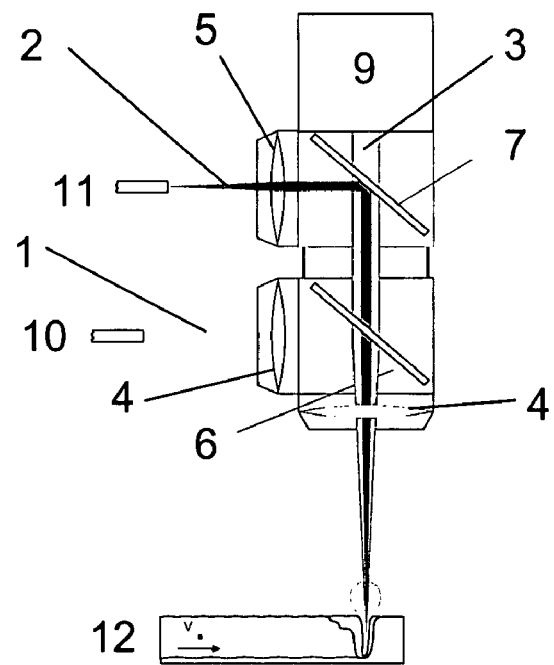
FIG. 3 a first example of a machining head according to the present invention.

FIG. 3 shows an example of a development of the present device for carrying out the method. The figure shows the machining head with the beam forming or focussing optics 4 and the dichroic deflection mirror 6, by means of which the laser beam 1 launched via a fibre 10 is directed onto the surface of the workpiece 12. During the machining the workpiece 12 is passed under the laser beam 1 with the speed vs in order to achieve the desired machining results. The present device additionally has a launching aperture for the illumination beam 2, in the present case a laser beam of a laser diode. The illumination beam 2 is employed for illumination of the machining region 13 of the workpiece via a beam splitter plate 7 through the dichroic deflection mirror 6. It is obvious that the wavelength of the illumination beam 2 has to be selected suitably so that the illumination can take place through the dichroic mirror 6. The beam formation is carried out via optics 5 in conjunction with the workpiece-side part of the focussing optics 4 employed for the laser beam formation.

The optical beam portions 3 re-reflected from the workpiece surface take the same route back through the beam splitter plate 7 to a CMOS camera 9 which records a local resolution image of the radiation re-reflected from the machining region 13. The CMOS camera 9 in this example, and also in the next example of FIG. 4, is connected with an evaluation device that is not shown, which evaluates the reflection patterns of the exposures for determining the desired phase boundaries.

Figure 4:
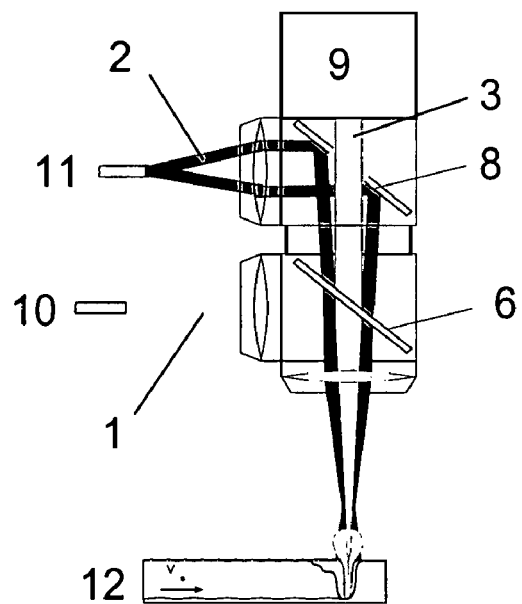
FIG. 4 a second example of a machining head according to the present invention.

FIG. 4 shows a further example of a development of the present device where, deviating from the development of FIG. 3, the illumination beam 2 is split open ring-shaped and impacts on a scraper mirror 8 via which it is directed onto the machining region 13 of the workpiece 12 in the same manner as in FIG. 3. The beam portions 3 re-reflected from the machining region 13 can directly impact on the CMOS camera 9 through the aperture in the scraper mirror 8. This camera is oriented vertically to the beam axis of the machining laser beam 1 but can also be inclined at a minor angle to this axis.

As an extension of the method and in addition to the detection and evaluation of the reflection pattern the optical filter before the CMOS camera 9 not shown in this figure can be selected so that the intrinsic process illumination on the phase boundary liquid/gaseous is likewise detected by the camera. Thus, this phase boundary can also be automatically determined from the intensity distribution superimposed on the reflection pattern. FIG. 5 shows two examples in this regard for exposures of the coaxially illuminated machining region 13 during cutting with Nd:YAG laser radiation during monitoring with a, relative to FIG. 2, wide-band optical filter. In these exposures the portion of the process intrinsic radiation superimposed on the reflection pattern is visible in the centre which in the left part with the bright area shows the gaseous phase 18.

LIST OF REFERENCE NUMBERS

1 Machining laser beam
2 Optical radiation/illumination beam
2a Beam portion impacting on the melt
2b Beam portion impacting on solid phase
3 Re-reflected beam portions
4 Focussing optics
5 Illumination optics
6 Dichroic mirror
7 Beam splitter plate
8 Scraper mirror
9 CMOS camera
10 Fibre for machining beam
11 Fibre for illumination beam
12 Workpiece
13 Machining region
14 Melt
15 Gaseous phase
16 Melted-open area
17 Solid area
18 Gaseous phase
19 Area with surface normal approximately parallel to the machining beam

The invention claimed is:
1. A method for measuring phase boundaries of a material during the machining of a workpiece with a machining beam, where during the machining a machining region comprising an impact location of the machining beam on the workpiece is additionally illuminated at least approximately coaxially to the machining beam with optical radiation, optical radiation reflected from the machining region is detected parallel to an incidence direction of the optical radiation or at a small angle thereto with an optical detector with local resolution in order to obtain an optical reflection pattern of the machining region, characterized in that with an image processing algorithm a course of one or several phase boundaries between the liquid and solid phase in the machining region is determined in an automated manner by means of a transition from an area with a large-surface homogeneous area to an area with many small-surface homogeneous areas in the optical reflection pattern.

2. The method according to claim 1,
characterized in that from the optical reflection pattern one or several areas of a melt of the workpiece are determined in which a surface normal of a surface of the melt within pre-determinable limits, is situated approximately parallel to the machining beam.

3. The method according to claim 1,
characterized in
that the optical radiation for illumination of the machining region is selected so that secondary radiation created through the machining can be at least partly suppressed relative to the reflected radiation with an optical filter which is arranged in front of the optical detector.

4. The method according to claim 3,
characterized in
that an intensity of the optical radiation for illumination of the machining region and the optical filter are selected so that the secondary radiation can continue to be detected with the optical detector and that the detected secondary radiation is created for determining a phase boundary between the liquid and gaseous phase.

5. The method according to claim 1, characterized in that an intensity of the optical radiation for illumination of the machining region is selected so that secondary radiation created through the machining is over-radiated by the reflected radiation on the optical detector.

6. The method according to claim 2, characterized in that the determination of the areas of a melt of the material in which a surface normal of a surface of the melt within pre-determinable limits is situated approximately parallel to the machining beam, automatically takes place with an image processing algorithm.

7. The method according to claim 1, characterized in that the illumination and the detection of the reflected radiation take place through a dichroic mirror via which the machining beam is directed onto the workpiece.

8. The method according to claim 1, characterized in that the illumination and the detection of the reflected optical radiation take place through an aperture in a deflection and/or focussing mirror via which the machining beam is directed onto the workpiece.

9. A device for the machining of a workpiece with a machining beam, at least comprising a machining head having a launching aperture for the machining beam a further launching aperture for an illumination beam, beam forming optics and a deflection mirror by means of which the machining beam is directed along a beam axis through an exit aperture onto a machining plane located in front of the machining head, illumination optics which directs the illumination beam at least approximately coaxially to the beam axis of the machining beam through the deflection mirror onto the machining plane, and an optical detector which is arranged so that it can detect with local resolution optical radiation reflected from the machining plane parallel to the beam axis or at a small angle thereto, and an evaluation device connected with the optical detector having an image processing algorithm for evaluating a detected reflection pattern for determining the course of one or several phase boundaries between the liquid and solid phase by means of a transition from an area with a large-surface homogeneous area to an area with many small-surface homogeneous areas in the optical reflection pattern.

10. A machining head according to claim 9,
characterized in that the deflection mirror is a dichroic mirror.

11. The machining head according to claim 9,
characterized in that the deflection mirror has at least one aperture through which the illumination beam is directed onto the machining plane.

\* \* \* \* \*